May 18, 1926.
C. A. STICH
POWER HACK SAW
Filed Jan. 28, 1924   3 Sheets-Sheet 1
1,585,432
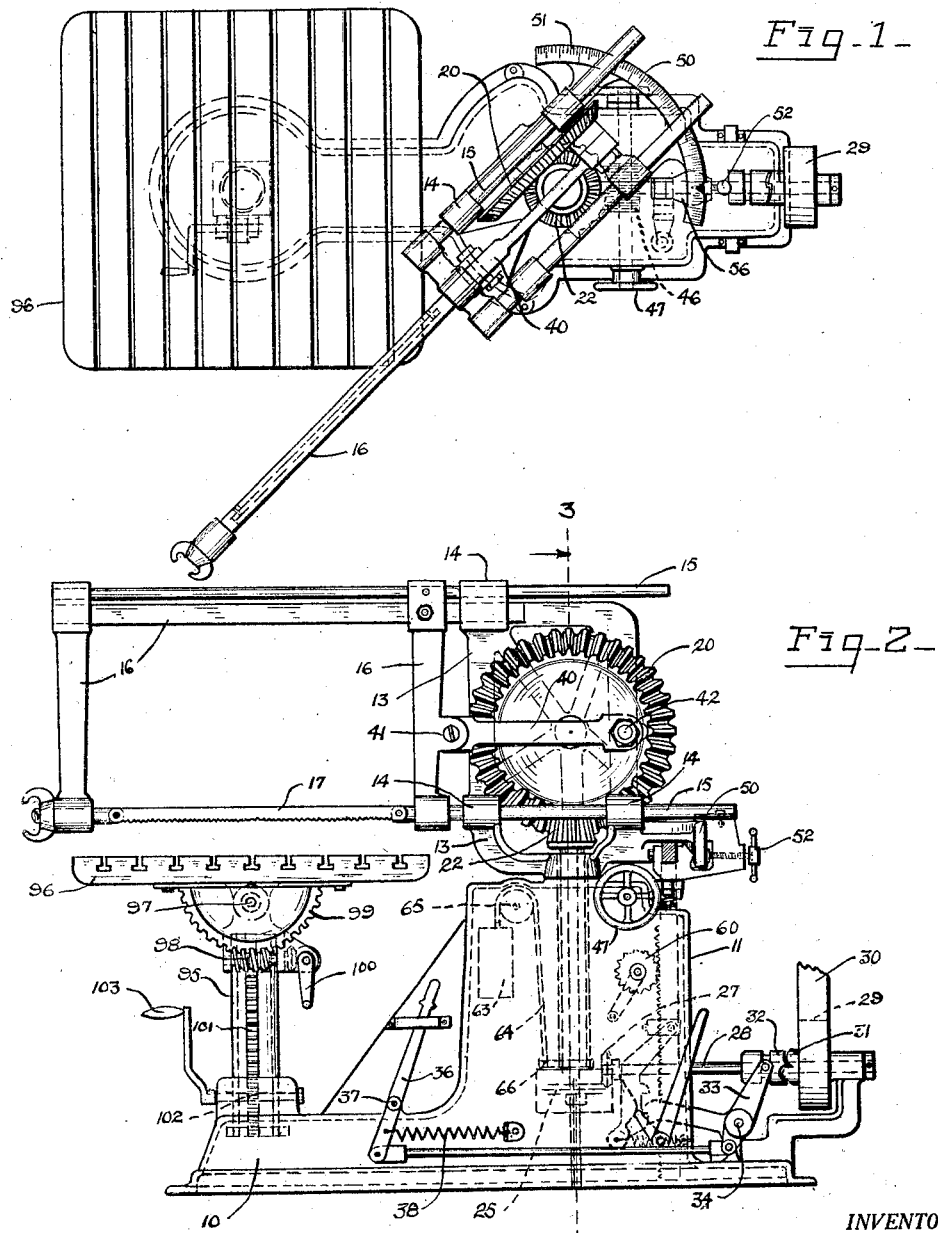
Fig-1-
Fig-2-
INVENTOR.
Charles A. Stich.
BY
Morsell, Keeney & Morsell
ATTORNEYS.

May 18, 1926.
C. A. STICH
1,585,432
POWER HACK SAW
Filed Jan. 28, 1924     3 Sheets-Sheet 2
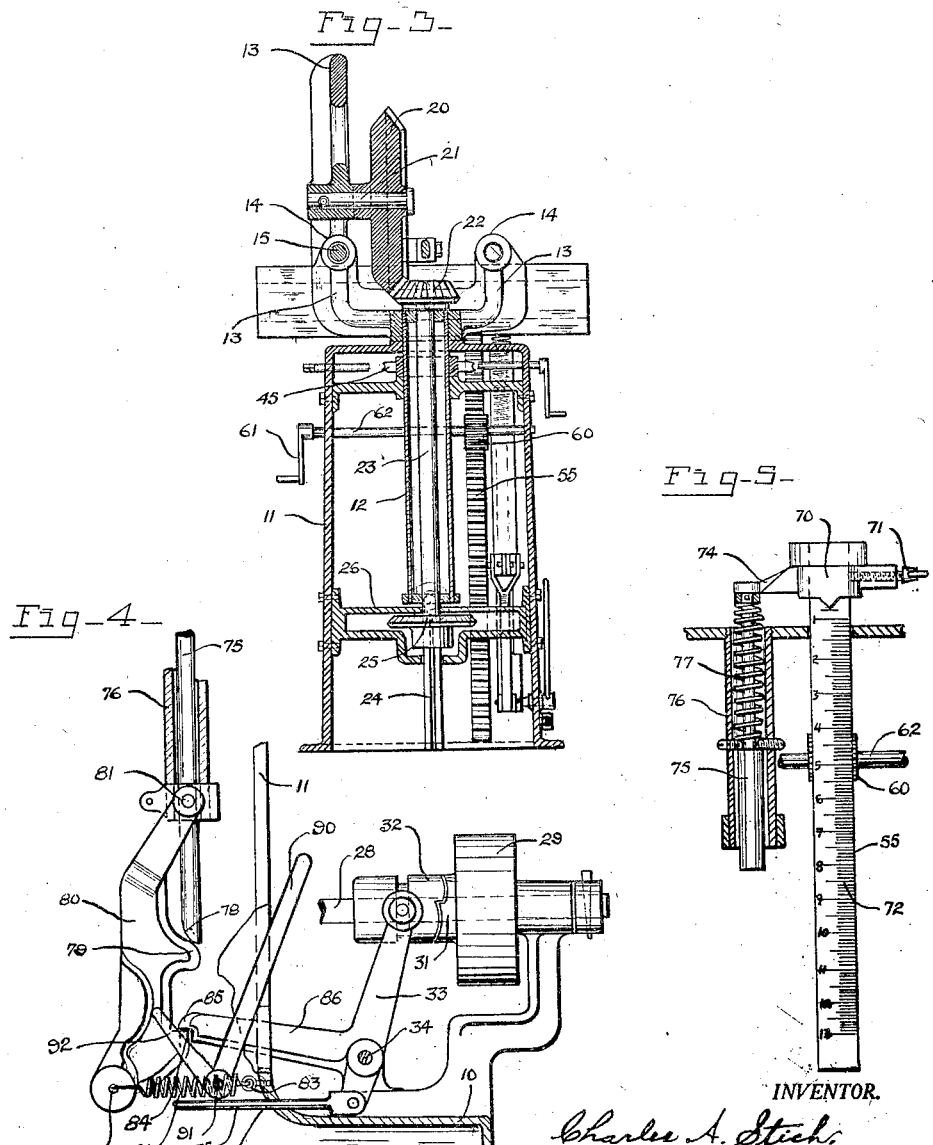
INVENTOR.
Charles A. Stich.
BY
Morsell, Kenney & Morsell
ATTORNEYS.

May 18, 1926.
C. A. STICH
1,585,432
POWER HACK SAW
Filed Jan. 28, 1924    3 Sheets-Sheet 3
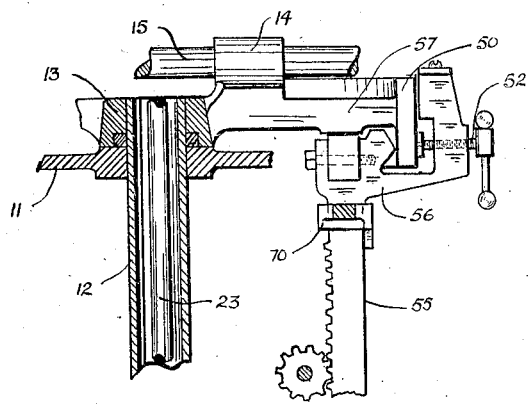
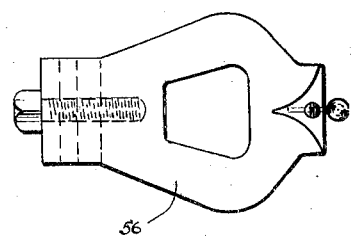
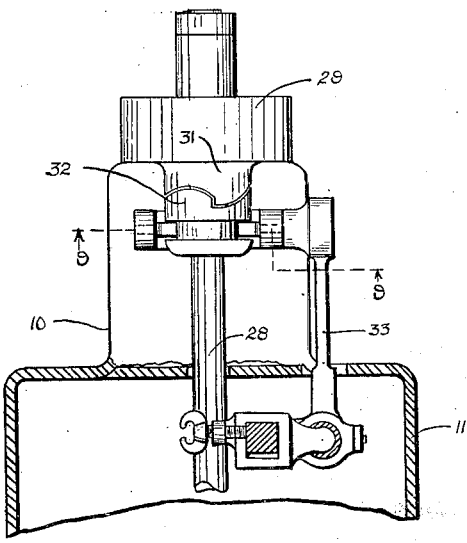
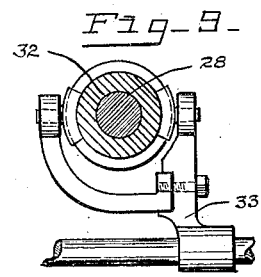
INVENTOR.
Charles A. Stich.
BY
Morsell, Keeney & Morsell,
ATTORNEYS.

Patented May 18, 1926.

1,585,432

UNITED STATES PATENT OFFICE.

CHARLES A. STICH, OF PLYMOUTH, WISCONSIN.

POWER HACK SAW.

Application filed January 28, 1924. Serial No. 689,066.

This invention relates to power hack saws, and has for one of its objects to provide a saw of this character provided with means whereby it may be angularly displaced or set relative to the supporting frame and the work mounted thereon, to the end that the said work may be cut at any desired angle.

A further object of the invention is to provide a hack saw of the class described having means whereby the operation of the saw may be stopped automatically when any predetermined depth of cut has been reached.

With the above and other objects in view which will appear as the description proceeds, the invention consists in the novel details of construction, combinations and arrangements of parts, more fully hereinafter described and particularly pointed out in the appended claims.

Referring to the accompanying drawings in which like reference characters designate like parts in all the views;

Figure 1 is a top plan view of a hack saw constructed in accordance with the present invention, the saw frame being shown set at an angle approximately 45 degrees.

Fig. 2 is a side elevational view of the parts shown in Fig. 1, the saw frame being shown, however, when occupying its normal position;

Fig. 3 is a vertical sectional view, taken approximately on the plane indicated by the line 3—3 of Fig. 2, looking in the direction of the arrows;

Fig. 4 is a detail, sectional view, on a larger scale, of the clutch and other power control mechanism;

Fig. 5 is an enlarged detail sectional elevational view of the mechanism for controlling the power stop device shown in Fig. 4;

Fig. 6 is a detail sectional elevational view of a portion of the saw frame supporting table;

Fig. 7 is a plan view of the clamping means shown in Fig. 6 for holding the saw frame supporting table in any desired adjusted position;

Fig. 8 is a horizontal sectional plan view of a portion of the parts shown in Fig. 4; and, Fig. 9 is a transverse sectional view, taken approximately on the plane indicated by the line 9—9 of Fig. 8, looking in the direction of the arrows.

In the said drawings, the numeral 10 indicates a suitable base or support, which may take the form of a casting shaped substantially as shown and in the vertical extension 11 of which there is mounted for vertical and rotary movement, a tube or sleeve 12. The upper end of the said tube or sleeve has secured to it a skeleton saw frame supporting table 13, provided with suitable guide bosses 14 for receiving the slide members 15 of the saw frame 16, which may be of any suitable construction and adapted to receive and hold a hack saw blade 17.

The said skeleton table 13 carries a bevelled gear 20, horizontally journalled thereon by means of a pin stud 21, which gear meshes with a bevelled pinion 22 carried by a vertical shaft 23, extending axially through the tube or sleeve 12, and suitably journalled for rotation therein. The lower end of the said shaft 23 is provided with an elongated keyway 24, by means of which there is splined to the said shaft a bevelled gear 25, which is suitably journalled in a portion 26 of the extension 11, and held therein against longitudinal movement, to the end that the said shaft 23 may slide therethrough, while at the same time it may be rotated by the said gear.

Meshing with the said gear 25 is a companion bevelled gear 27, carried by the horizontally disposed shaft 28, which is journalled in suitable bearings carried by the base 10 and the said shaft has loosely mounted upon it a pulley or drive wheel 29, which is adapted to receive power from any suitable source, not shown, by means of the belt 30, see Fig. 2. The pulley 29 is provided with a clutch member 31, which is adapted to be engaged and disengaged by a companion clutch member 32 splined upon the shaft 28 and adapted to be moved longitudinally thereon by means of a bell crank lever 33, pivotally mounted as at 34 upon the base 10.

A link 35 connects the said bell crank lever with a hand lever 36, pivotally mounted as at 37 upon the said base 10, and provided with a suitable spring 38, which normally tends to move the link 35 toward the right from the position shown in Fig. 2, and to thereby disengage the clutch member 32 from the clutch member 31.

Motion from the bevelled gear 20 is transmitted to the hack frame 16 by means of a connecting rod 40, pivotally secured as at 41 to the said frame 16, and to the said gear 20 by the crank pin 42, which latter pin may, if desired, be positioned within a slot, not shown, in the gear 20, whereby the length of the stroke of the hack saw may be lengthened and shortened, as desired.

As above stated, the tube or sleeve 12 is rotatably mounted in the vertical housing or extension 11 of the base 10 and it carries at its upper end the skeleton table 13, which in turn slidably mounts the hack saw frame 16. It thus results that by moving the tube or sleeve 12 about its axis that the said frame 16 may be angularly displaced to any desired degree of the limits of the machine, so as to cause the hack saw blade 17 to cut the work at any desired and predetermined angle.

This rotation of the sleeve 12 and the hack saw frame may be accomplished in any desired manner, as for example, by means of a worm wheel or sector 45, see Fig. 3, which is engaged by a worm 46, see Fig. 1, and which may be rotated by means of a suitable hand wheel 47, as will be readily understood. The said sector 45 must, of course, be splined to the tube 12 inasmuch as the said tube must be capable of vertical movement in order to provide a vertical adjustment of the hack saw frame, as will appear more fully below.

In order to accurately determine the degree of angularity when the frame 16 and table 13 are displaced in the horizontal plane, the said table may carry an arcuate member 50, one surface of which may be provided with a suitable scale 51, see Fig. 1, and which arcuate member 50 may be engaged by a suitable clamping screw 52, see Figs. 2 and 6, to maintain the parts in their adjusted positions, after they have been once set.

In order to provide for the vertical adjustment of the hack saw, there is provided a rack 55, vertically slidably mounted in the housing 11, the upper end of which constitutes a bracket 56, which supports the extension 57 of the skeleton table 13. The bracket 56 also carries the clamping screw 52, above described, and when the said screw is tightened against the arcuate member 50, it serves to substantially rigidly connect the table 13 with the said rack 55. The said rack may be vertically adjusted by means of a gear 60, engaging the teeth thereof, see Figs. 2 and 3, which gear may be rotated by means of a crank or handle 61, rigid with the shaft 62, upon which the said gear is mounted.

It will be obvious that by rotating the crank or handle 61, and the gear 60, that the rack 55 may be caused to move upwardly and downwardly, as desired, and through its connection with the table 13, the latter, together with the hack saw frame 16 may be adjusted vertically to any desired position. The weight of the frame 16, and table 13 may be counterbalanced by means of a counterbalancing weight 63, see Fig. 2, which may be suspended by means of a chain or cable 64, passing over a pulley or sheave 65, within the housing 11 and having its other end secured in any suitable manner to the tube or sleeve 12, as at 66.

In order that an automatic control may be had whereby the power may be cut off when a predetermined depth of cut has been reached by the saw, a stop mechanism is provided comprising a collar 70 slidably mounted upon the rack 55 and adapted to be clamped in different positions thereon by means of a clamping screw 71, see Figs. 5 and 6. The said rack 55 may be provided with a suitable scale 72 to assist in positioning the collar 70 at the proper point to gauge the depths of the cut, as is clearly indicated in the said Fig. 5.

The said collar 70 is provided with a projecting finger 74, which is adapted to engage the upper end of a plunger rod 75, which is slidably mounted within a tubular casing 76, and which is normally urged upwardly by means of a compression spring 77. The said rod or plunger 75, as is best shown in Fig. 4, extends downwardly and terminates in a rounded end 78, which rounded end is adapted to co-act with a cam surface 79, provided upon a trip member 80, which member is pivotally hung, as at 81, upon the lower end of the supporting guiding tube or sleeve 76. The said trip member 80 is normally drawn toward the right, as seen in Fig. 4, by means of a coiled spring 81, one end of which is secured to the lower end of the said member 80, as at 82, and the other end of which spring may be secured to the portion of the base 10, as at 83.

The said trip member 80 is also provided with a shoulder 84, which is adapted to engage the recessed end 85 of the arm 86 of the bell crank lever 33, and to thus prevent movement of the bell crank lever 33 under the influence of the link 35 and spring 32 from the clutch member 31. It thus results that when the parts are in the positions illustrated in Fig. 4, the clutch members will be maintained in engagement and power will be transmitted from the main power shaft 28 to the hack saw frame 16, whereby the latter may be reciprocated, which transmission will continue as long as the parts remain in the positions illustrated in said Fig. 4.

On the other hand, when the saw blade 17 has cut to such a depth that the table 13 has descended far enough to bring the finger 74 of the collar member 70 into engagement with the upper end of the plunger member 75, which engagement will depress the said plunger member against the compression of the spring 77, then the lower rounded end 78 of the said plunger member 75, will engage the cam surface 79 of the trip member 80 and will force the said trip member to pivot about the pin 81 in a clockwise direction, thereby disengaging its toe or shoulder 84 from the notched end 85 of the bell crank lever 33, which in turn is permitted to oscillate about its pivot 34, under the influence of the spring 38, and to thereby disengage the clutch members, 31 and 32, thus cutting off power from the hack saw frame 16.

The parts may be restored to their operative positions by moving the hand lever 36 in a clockwise direction, raising the table 13 to permit the plunger 75 to rise sufficiently to permit the trip member 80 to return to its initial position shown in Fig. 4. In order to facilitate the resetting of the parts, an auxiliary hand lever 90 is provided, see Fig. 4, which may be pivoted as at 91 and provided with an arm 92 adapted to engage and raise the arm 86 of the bell crank lever 33, when the same lever 90 is rocked in a clockwise direction, as will be readily understood.

The base 10 is also provided with a suitable standard 95 on the top of which is pivotally mounted a suitable work supporting table 96, which table may be rocked about its pivot 97 in a vertical plane, by means of a worm 98, engaging a sector 99 rigid with the said table. The said worm may be rotated in any suitable manner, as by the hand crank 100, see Fig. 2.

The said work table may also be raised and lowered by means of a rack 101 which may be engaged by suitable gear and pinion 102, adapted to be rotated by means of a hand lever or crank 103.

While one form of the invention has been illustrated and described, it is obvious that those skilled in the art may vary the details of construction as well as the arrangement of parts without departing from the spirit of the invention, and therefore it is not wished to be limited to the above disclosure except as may be required by the accompanying claims.

What is claimed is:

1. In a power driven hack saw, a base; a tubular sleeve slidably and rotatably carried by said base; a table carried by said sleeve; a saw frame slidably carried by said table; means for clamping said frame, table and sleeve in a predetermined angular position, while permitting of their vertical movement; and means for moving said table, frame and sleeve vertically.

2. In a power driven hack saw, a base; a tubular sleeve slidably and rotatably carried by said base; a table carried by said sleeve; a saw frame slidably carried by said table; means for clamping said frame, table and sleeve in a predetermined angular position, while permitting of their vertical movement; and means comprising a rack carried by said clamping means, and a pinion meshing therewith for moving said table, frame and sleeve vertically.

3. In a power driven hack saw, a base; a tubular sleeve slidably and rotatably journalled in said base; a shaft rotatably and slidably journalled in said sleeve; a table carried by said sleeve; a saw frame slidably mounted on said table; a gear provided with a crank pin carried by said table; a companion gear meshing therewith, carried by said shaft; a connecting rod, connecting said crank pin and said saw frame; means for rotating said sleeve; means for clamping said table and sleeve against rotation; and means for supplying power to said shaft.

4. In a power driven hack saw, a base; a tubular sleeve slidably and rotatably journalled in said base; a shaft rotatably and slidably journalled in said sleeve; a table carried by said sleeve; a saw frame slidably mounted on said table; a gear provided with a crank pin carried by said table; a companion gear meshing therewith, carried by said shaft; a connecting rod, connecting said crank pin and said saw frame; means for rotating said sleeve; means for clamping said table and sleeve against rotation; means for raising and lowering said sleeve, table and frame; means for supplying power to said shaft; and a power stop mechanism controlled by the vertical movement of said table for cutting off the power at a predetermined point in said movement.

5. A power stop mechanism for hack saws and the like having a clutch and a movable member, comprising a trip member having a cam surface and a shoulder; a lever controlling said clutch and having an arm adapted to engage said shoulder; and a plunger adapted to be moved by said movable member whereby it may be caused to engage said cam surface to disengage said shoulder from said arm to cause movement of said clutch.

6. In a power driven hack saw, a support, a saw frame mounted for vertical sliding movement on said support, a rack for vertically sliding said saw frame, power means for reciprocating said saw frame, means for disconnecting the power from said reciprocating means, and means adjustably mounted on said rack for operating said power disconnecting means.

In testimony whereof, I affix my signature.

CHARLES A. STICH.